Oct. 3, 1950      S. K. ANDERSEN      2,524,066
AIRCRAFT HEAT EXCHANGER
Filed Jan. 3, 1947
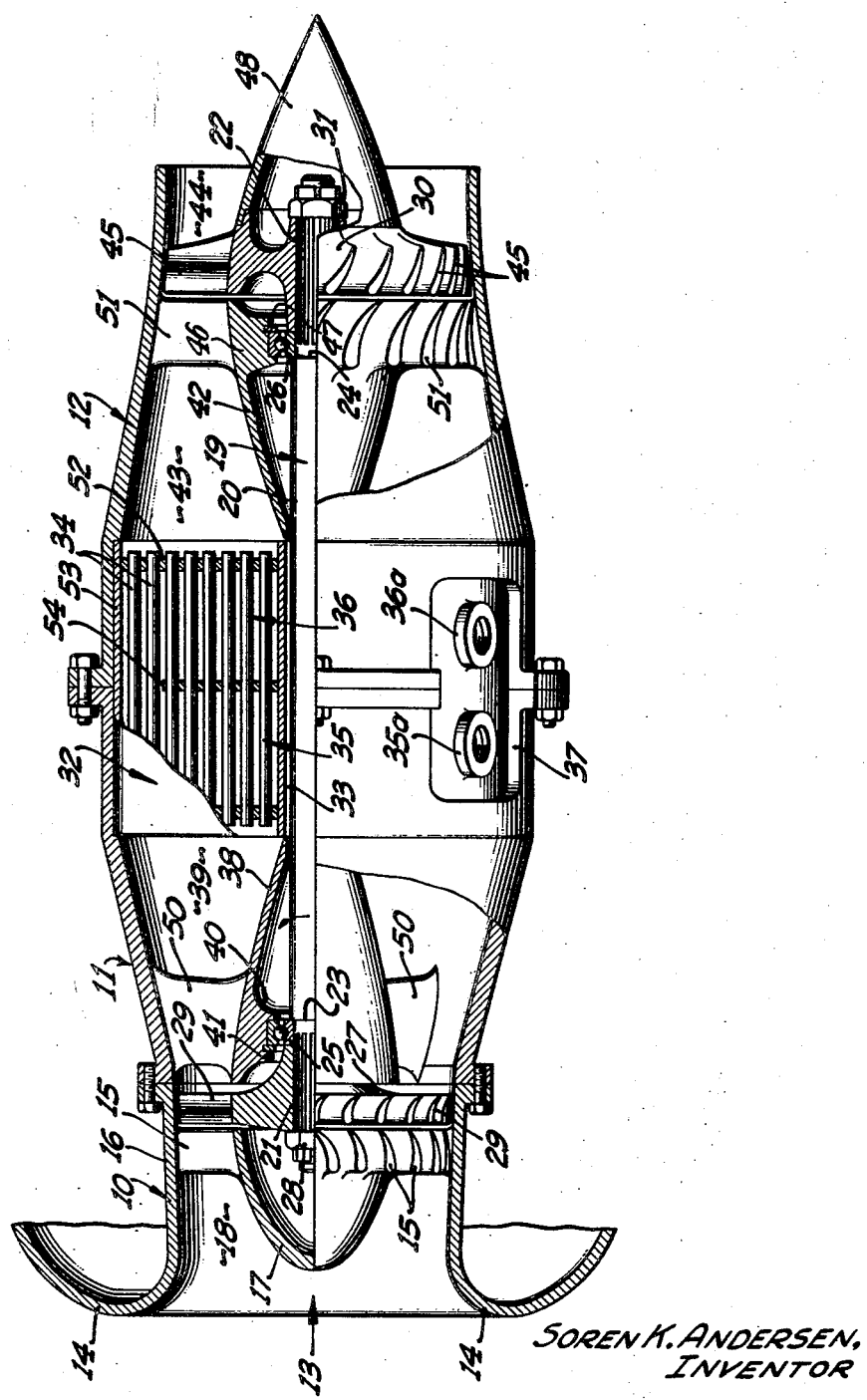
SOREN K. ANDERSEN,
INVENTOR
BY John H.G. Wallace
AGENT.

Patented Oct. 3, 1950

2,524,066

UNITED STATES PATENT OFFICE 2,524,066

AIRCRAFT HEAT EXCHANGER

Soren K. Andersen, Los Angeles, Calif.

Application January 3, 1947, Serial No. 719,990

15 Claims. (Cl. 62—136)

This invention relates in general to heat exchangers, and relates in particular to heat exchangers employed on aircraft. More particularly, the invention relates to an aircraft heat exchanger wherein heated fluid is passed in heat exchange relationship with a flow of cooling medium such as air.

Heat exchangers of the type now generally employed for aircraft installation utilize ambient atmospheric air as the cooling medium. In high speed aircraft the problem of cooling heated fluid is complicated by the fact that the comparatively still atmospheric air used as the cooling medium must be accelerated in its passage into the heat exchanger, and in consequence is heated by the work done upon it in such acceleration. In very high speed aircraft this heating effect, the adiabatic temperature rise due to ram, is of such magnitude that it may be impossible to obtain adequate heat dissipation in the heat exchanger with the amount of coolant flow available. Therefore, for satisfactory cooling at high speeds, it may be necessary to employ auxiliary cooling means to reduce the temperature of the coolant air before passing it through the heat exchanger.

It is an object of the invention to utilize the ram energy of the coolant air in a simple and compact cooling device by extracting work from the coolant by mechanical means, such as a fluid driven engine or turbine, before the coolant flows through a heat exchanger, thereby increasing the efficiency of the coolant by lowering its temperature before it extracts heat from the fluid in the heat exchanger, the cooling means and the heat exchanger being arranged to reduce the flow losses to a minimum.

It is a further object of the invention to provide a simple and compact cooling device of the character set forth in the preceding paragraph wherein work extracted from the coolant is utilized to eject the coolant.

It is an object of the invention to provide a simple, compact, and efficient cooling device in which the heat exchanger, the means to precool the coolant, and the means to eject the coolant, are aligned in a common duct.

Further objects and advantages of the invention will be apparent from the following description taken in conjunction with the accompanying drawing, wherein is shown an elevational view, partly in section, of a preferred form of the invention.

The cooperating parts of the cooling device are aligned in a common air duct consisting of a front section 10, a middle section 11 and an after section 12. The front section 10 has a forwardly extending coolant entry inlet 13 which merges a cylindrical wall portion 16, at its front end 14, with the contour of the supporting structure, such as an aircraft nacelle, wing or fuselage. Guide vanes 15, extending inwardly from the cylindrical wall portion 16, support a rounded nose or body 17, presented toward the flow of air into the inlet 13 and defining an annular passage 18 into which the air is diverted.

The shaft 19, positioned centrally within the sections 11 and 12, has an intermediate portion 20 of major diameter, and projecting end portions 21 and 22 of reduced diameter, there being shoulders 23 and 24 at the ends of intermediate portion 20 against which one face of the inner races of ball bearings 25 and 26 rests.

A turbine rotor 27, splined or otherwise fixed to the reduced end portion 21 on the forward end of the shaft 19, has the rearward end of its hub securely held against the other face of the inner race of the ball bearing 25 by the nut 28 threaded on the forward end of the shaft. The turbine rotor has turbine vanes 29 which project into the airstream in the annular passage 18 whereby the turbine rotor 27 is caused to rotate at high velocity.

A fan 30 adapted to utilize the power recovered by the turbine rotor 27 to pump air, is splined or otherwise fixed to the reduced end portion 22 on the rearward end of the shaft 19, and has the forward face of its hub securely held against the other face of the ball bearing 26 by the nut 31 threaded on the rearward end of the shaft.

Intermediate the turbine rotor 27 and the fan 30 is a conventional cross-flow heat exchanger 32 comprising a shell section 53 divided into an inlet pass 35 and an outlet pass 36 by baffle 54 and closed at each end by end plates 52 perforated for reception of longitudinally extending tubes or air ducts 34 through which the precooled coolant air is conducted in heat exchange relationship to the hot fluid. The inlet connection 35a and the outlet connection 36a for the hot fluid are effected through the outer periphery 37 of the shell of the heat exchanger 32. A central passage 33 extending longitudinally through the heat exchanger 32 accommodates the shaft 19.

A streamlined shroud member 38 conducts the flow of air with minimum turbulence in the space 39 between the zone of the vanes 29 of the turbine 27 and the heat exchanger 32. Projecting inwardly from the walls of the streamlined shroud member 38 is an annular flange 40 formed to engage the outer race of the ball bearing 25 which is held in place by the snap ring 41. A plurality of radial struts 50 extending inwardly from the outer wall of the middle section 11 supports the streamlined shroud member 38.

A second streamlined shroud member 42 conducts the flow of air with minimum turbulence in the space 43 between the heat exchanger 32 and the passage 44 occupied by the blades 45 of the fan 30. An annular flange 46 projecting inwardly from the walls of the streamlined shroud member 42 is provided with a recess for engaging the outer race of the ball bearing 26 which is held in place by the snap ring 47. Guide vanes 51, extending inwardly from the outer walls of the aftermost section 12 support the streamlined shroud member 42.

A streamlined spinner 48 removably attached to the hub of the fan 30 directs the flow of air through the passage 44 with minimum turbulence after leaving the zone of the fan blades 45.

When the aircraft is operated at relatively high speed, the ram air enters the entry inlet 13, is diverted by the body 17 into the annular passage 18, flows through the guide vanes 15 and impinges on the turbine vanes 29 causing the turbine wheel to rotate at high speed. The absorption of power from the air, resulting from its driving of the turbine rotor 27, results in a cooling of the air. The flow of the air through the tubes 34 of the heat exchanger 32, across the space 43 and out past the guide vanes 51, is assisted by the propelling action of the fan blades 45. The fan 30 thus constitutes a power utilizing means for usefully applying a load to the turbine rotor 27.

The compact arrangement of the cooling device in the embodiment shown, wherein the precooling means, the heat exchanger and the fan are axially aligned, reduces the weight to a minimum, which is an important factor to be considered in devices intended to be used on aircraft. Furthermore, the alignment of the units reduces friction losses to a minimum.

A comparative analysis for an airplane having an air speed of 518 M. P. H., to determine the quantity of coolant air required, showed that a conventional oil cooling system using ram cooling air required a flow of 1100 lb./min. of air through the heat exchanger to obtain the required heat rejection, whereas, an oil cooling device having a heat exchanger of identical size, wherein heat was extracted from the air before passing it through the heat exchanger as described in this invention, required a flow of only 325 lb./min. of coolant air to obtain the same heat rejection.

Although the invention has been described with particular reference to a high speed airplane having a ram duct, it will be appreciated that the principles herein set forth may be employed with equal satisfaction on any vehicle, rocket or guided missile passing through the atmosphere at high speed. Furthermore, other work absorbing means such as a generator, fuel pump, vacuum pump, etc., may be utilized, instead of the fan 30, for usefully applying a load to the turbine rotor 27. The invention may be further varied in an aircraft by bleeding the motivating air from the compressor of a jet engine instead of supplying ambient atmospheric air by means of a ram duct as shown. Further variations may also be effected in the arrangement and structure described without departing from the spirit and scope of the invention as defined by the appended claims.

I claim:

1. A cooling device for a high speed aircraft comprising a duct through which a flow of coolant air is conducted, a heat exchanger disposed in said duct, an expansion turbine in said duct upstream of said heat exchanger and driven by said flow of coolant air for cooling the coolant air before it passes through the heat exchanger, a fan in said duct downstream of said heat exchanger for propulsion of said coolant air flowing through said duct, and a shaft extending through said heat exchanger and traversing said duct from said turbine to said fan for transmitting power from said turbine to said fan.

2. A cooling device for a high speed aircraft comprising a duct through which a flow of coolant air is conducted, a heat exchanger disposed in said duct, an air turbine in said duct upstream of said heat exchanger and driven by said flow of coolant air for cooling the coolant air before it passes through the heat exchanger, a fan in said duct downstream of said heat exchanger for moving said coolant air through said duct, and power transmission means extending through said heat exchanger and traversing said duct for transmitting power from said air turbine to said fan.

3. A cooling device comprising a duct through which a flow of coolant air is conducted, a heat exchanger disposed in said duct, a shaft extending through said heat exchanger and traversing said duct, a power absorption device connected to the end of the shaft downstream of the heat exchanger, and an air driven turbine fixed on the other end of the shaft for rotating the same so as to drive said power absorption device.

4. A cooling device comprising duct means through which a flow of coolant air is conducted, a generally tubularly shaped heat exchanger having its axis disposed within said duct means, work extraction means in said duct means axially aligned with said heat exchanger on the upstream side thereof and driven by said flow of coolant air for cooling the coolant air before it passes through the heat exchanger, and work absorption means driven by said work extraction means.

5. A cooling device comprising duct means for conducting a flow of coolant air, a heat exchanger disposed in said duct means, power transmission means extending through said heat exchanger, work extraction means in said duct means operatively connected to said power transmission means upstream of the heat exchanger and driven by said flow of coolant air for cooling the coolant air before it passes through the heat exchanger, and air pumping means in said duct means operatively connected to said power transmission means downstream of said heat exchanger and driven by said work extraction means for moving said coolant air through said heat exchanger.

6. A cooling device comprising duct means for conducting a flow of coolant air, a generally tubularly shaped heat exchanger having its axis disposed within said duct means, work extraction means in said duct means axially aligned with said heat exchanger on the upstream side thereof and driven by said flow of coolant air for cooling the coolant air before it passes through the heat exchanger, and means disposed in the discharge flow of coolant air from said heat exchanger for assisting the flow therethrough, said last-named means being driven by said work extraction means.

7. A cooling device comprising duct means for conducting a flow of coolant air, a generally tubularly shaped heat exchanger having its axis disposed within said duct means, a cooling and power recovery turbine in said duct means axially aligned with said heat exchanger on the upstream side thereof and driven by said flow of coolant air, and means for utilizing the power recovered by said turbine.

8. A cooling device comprising: duct means for the flow of an elastic coolant fluid therethrough, heat exchange means within said duct means, an expansion engine in said duct means upstream of said heat exchange means, a rotatable shaft passing through said heat exchange means and connected to said expansion engine, and work absorption means connected to said shaft.

9. A cooling device comprising: duct means for the flow of an elastic coolant fluid therethrough, heat exchange means within said duct means, an expansion engine in said duct means upstream of said heat exchange means, a rotatable shaft passing through said heat exchange means and connected to said expansion engine, and work absorption means connected to said shaft downstream of said heat exchange means.

10. A cooling device comprising: duct means for the flow of coolant fluid therethrough, heat exchange means in said duct means, work extraction means in said duct means upstream of said heat exchange means, work absorption means in said duct means downstream of said heat exchange means, said work extraction means and said work absorption means being disposed in axial alignment with said heat exchange means, and shaft means connecting said work extraction and work absorption means.

11. A heat exchanger for a high speed aircraft provided with a duct means for a coolant fluid, comprising: a plurality of duct sections in said duct means; means for securing said duct sections in flow alignment; heat transfer means secured in said duct means proximate the securing means for two of said plurality of duct sections; a turbine upstream of said heat transfer means; a fan downstream of said heat transfer means; support means for said turbine and said fan carried by said duct means; power transmission means extending through said heat transfer means and connecting said fan with said turbine to be driven thereby; guide means in one of said duct sections for directing coolant fluid into said turbine; and further guide means in another of said duct sections for directing coolant fluid into said fan.

12. The invention of claim 11 further characterized in that one of the two duct sections proximate the heat transfer means is also the duct section carrying the turbine support means, and the other of the two duct sections is also the duct section carrying the fan support means.

13. A heat exchanger for a high speed aircraft provided with duct means for a coolant fluid flow, comprising: a plurality of duct sections in said duct means; means for securing said plurality of duct sections in flow alignment; generally annular heat transfer means secured in said duct means proximate the securing means for two of said plurality of duct sections; a power shaft extending through said heat transfer means; bearing means for said power shaft carried by at least two of said plurality of duct sections; a turbine on said shaft upstream of said heat transfer means; a fan on said shaft downstream of said heat transfer means; guide means in one of said duct sections for directing entrance of coolant fluid into said turbine; and further guide means in another of said duct sections for directing entrance of coolant fluid into said fan.

14. The invention of claim 13 further characterized in that the two duct sections proximate the heat transfer means are also the duct sections carrying the power shaft bearing means.

15. A cooling device comprising: duct means for the flow of a coolant fluid therethrough; heat exchange means within said duct means; and means for cooling said coolant fluid on the upstream side of said heat exchanger including work extraction means in said duct means upstream of said heat exchange means and in axial alignment therewith, and means for absorbing the work extracted from said coolant fluid by said extraction means.

SOREN K. ANDERSEN.

REFERENCES CITED

The following references are of record in the file of this patent:

UNITED STATES PATENTS

| Number | Name | Date |
| --- | --- | --- |
| 2,098,558 | Anderson | Nov. 9, 1937 |
| 2,175,163 | Waterfill | Oct. 3, 1939 |
| 2,244,319 | Thatcher | June 3, 1941 |
| 2,293,960 | Young | Aug. 25, 1942 |
| 2,374,607 | McCollum | Apr. 24, 1945 |
| 2,453,923 | Mayo | Nov. 16, 1948 |